United States Patent [19]

Toyama et al.

[11] 3,989,810
[45] Nov. 2, 1976

[54] HYDROGEN SULFIDE REMOVAL

[75] Inventors: Akira Toyama, Kobe; Koji Ishizaki, Akashi, both of Japan

[73] Assignee: Kobe Steel Ltd., Japan

[22] Filed: Feb. 24, 1975

[21] Appl. No.: 552,763

Related U.S. Application Data

[63] Continuation of Ser. No. 145,067, May 19, 1971, which is a continuation-in-part of Ser. No. 774,492, Nov. 8, 1968, abandoned.

[30] Foreign Application Priority Data

Nov. 16, 1967 Japan.............................. 42-74034
Nov. 16, 1967 Japan.............................. 42-74035

[52] U.S. Cl.......................... 423/573 R; 423/226; 55/73
[51] Int. Cl.$^2$...................................... C01B 17/04
[58] Field of Search ........... 423/571, 573, 226, 227; 55/73; 260/124 R

[56] References Cited
UNITED STATES PATENTS

| | | | |
|---|---|---|---|
| 3,095,275 | 6/1963 | Fierce et al......................... | 423/573 |
| 3,097,926 | 7/1963 | Nicklin et al....................... | 423/573 |
| 3,099,535 | 7/1963 | Maezawa......................... | 423/573 X |

FOREIGN PATENTS OR APPLICATIONS

| | | |
|---|---|---|
| 1,079,633 | 1/1959 | Germany |
| 436,665 | 6/1944 | Italy |

OTHER PUBLICATIONS

"Chemical Abstracts" vol. 57, 1962, p. 12766.
"Chemical Abstracts" vol. 58, 1963; p. 5571.

*Primary Examiner*—G. O. Peters

[57] ABSTRACT

A process for the removal and conversion into sulfur of hydrogen sulfide in a gaseous or liquid material which comprises essentially treating the said material with an oxidative lignin prepared by treating lignins with oxidizing agents, nitrating agents and/or demethylating agents and, if desired, introducing hydrophilic groups into the resultant product. The lignins include protolignin, isolated lignins and other denatured lignins. The process is advantageous essentially in that hydrogen sulfide can be removed economically and converted completely into sulfur, and that the desulfurization agents, i.e. the oxidative lignins, are non-toxic and non-corrosive.

13 Claims, No Drawings

HYDROGEN SULFIDE REMOVAL

This is a continuation of our application Ser. No. 145,067, filed May 19, 1971, which is, in turn, a continuation-in-part of our then copending application Ser. No. 774,492, filed Nov. 8, 1968, now abandoned.

This invention relates to a process for the removal of hydrogen sulfide. More particularly, it relates to a process for the removal, and conversion into sulfur, of hydrogen sulfide in a gaseous or liquid material. In addition, it relates also to a process for preparing desulfurization agents used in the above process.

Hitherto, there have been known various methods for the removal of hydrogen sulfide, e.g. the Seaboard process, the Girbotol process, the Perox process, the Giammarco-Vetrocoke process, the Thyrox process, etc. However, they have one or more drawbacks such as: (1) the removed hydrogen sulfide is released without receiving any chemical change in the regeneration process of the absorptive solution and causes pollution of the air; (2) the desulfurization agent employed is too expensive to perform the removal of hydrogen sulfide economically; (3) the condition for the removal process is limited (e.g. the absorptive solution has to be cooled in summer season); (4) a strict sanitary administration is required in the factory because of toxicity of the desulfurization agent such as arsenic compounds; and/or (5) the desulfurization agent employed is very corrosive against the plant steel.

In the course of studies on hydrogen sulfide removal, it has been discovered that specific oxidative lignins have unexpectedly excellent desulfurization ability and can be utilized for the purpose of the industrial desulfurizations. The present invention has been accomplished essentially on the basis of this discovery. Accordingly, a fundamental object of the present invention is to embody a process for the removal of hydrogen sulfide in a gaseous or liquid material. Another object of the invention is to embody a process for the conversion of hydrogen sulfide into sulfur. A further object of the invention is to embody a process for removing hydrogen sulfide from a gaseous or liquid material and recovering the hydrogen sulfide as sulfur. A still further object of the invention is to embody a process for preparing an oxidative lignin having an excellent desulfurization ability. These and other objects of the invention will become apparent to those conversant with the art to which the present invention concerns from the following detailed explanation of the invention and the working examples.

According to the present invention, hydrogen sulfide is removed from gaseous or liquid materials containing it by treatment with an oxidative lignin. When the material containing hydrogen sulfide is brought into contact with the oxidative lignin, hydrogen sulfide is converted into sulfur which can be easily separated from the gaseous or liquid materials. Although the oxidative lignin is simultaneously reduced and inactivated, it can be completely regenerated by treatment with an oxidizing agent such as air or oxygen. Accordingly, when the contact of the oxidative lignin with hydrogen sulfide is carried out in the presence of such an oxidizing agent as air or oxygen, the removal and conversion into sulfur of hydrogen sulfide can be performed continuously.

In the sense of the present invention, the oxidative lignin represents specific but a variety of lignin derivatives. Fundamentally, it includes those lignin derivatives which can be prepared from lignin by at least one of the following treatments: (1) treatment with an oxidizing agent, (2) treatment with a nitrating agent, and (3) treatment with a demethylating agent. Moreover, it includes those which are prepared by introducing hydrophilic substituents into the lignin derivatives prepared by at least one of the above-illustrated treatments (1) to (3). It should be noted that the term "lignin" here used is intended and desired to have a very broad sense and to include all the natural, isolated and other denatured lignins. That is to say, the lignin includes, for example, protolignin, sulfuric acid lignin, hydrochloric acid lignin, periodate lignin, alkali lignin, lignosulfonic acid, thiolignin, Brauns native lignin, Bjorkman lignin, dioxane lignin, hydrotropic lignin, alcohol lignin, phenol lignin, acetic acid lignin, cuproxam lignin, condensed lignin and other lignins or lignin-like substances contained in wood-saccharification liquids or waste liquors of the pulp industries. Among them, the condensed lignin means intramolecular condensation products of lignin, condensation products of lignin with other compounds and those condensation products activated by heating with an alkali. Examples of the condensed lignin include a resinous product obtained by heating demethylated lignin or lignosulfonic acid, a macromolecular product obtained by heating lignosulfonic acid or wood-saccharification lignin in an acidic water (in the case of the wood-saccharification lignin, the heating is carried out at a higher temperature for a longer time than the saccharification procedures), a condensation product obtained by $\gamma$-ray irradiation of lignin, a condensation product of lignin with methylene iodide, maleic acid, formalin and phenol, formalin and dimethylamine, etc.

The above-mentioned treatments of lignin for the preparation of the oxidative lignin will be illustrated in details below, respectively, 1. Treatment with an oxidizing agent:

This treatment can be achieved by mere treating of the lignin with an oxidizing agent. As illustrative of the oxidizing agent for this treatment are permanganic acid and its salts (e.g. potassium permanganate), chromic acid and related compounds (e.g. potassium dichromate, chromyl chloride), halogens (e.g. chlorine, bromine), peroxides (e.g. hydrogen peroxide, sodium peroxide), peracids (e.g. peracetic acid, perbenzoic acid), sulfuric acid, oxygen acids and their salts (e.g. sodium hypochlorite, bleaching powder, sodium chlorite, sodium bromite, periodic acid, potassium periodate), metal salts (e.g. ferric chloride, cupric chloride), oxygen, ozone, air, oxides (e.g. silver oxide, cupric oxide, manganese dioxide), and nitrobenzene. The condition for the treatment may be determined in consideration of the properties of the oxidizing agent employed and the lignin to be treated. Generally, the treatment can be performed at a wide range of temperature, e.g. from 0° C to 200° C. Although the reactions may differ in some cases with the reaction conditions adopted, the resultant products can be used as an oxidative lignin for the hydrogen sulfide removal independently of what kind of reaction takes place. For instance, a treatment of lignin with chlorine in an aqueous alkaline medium gives oxidation products and in an aqueous acidic medium chlorination products. But both of the oxidation and chlorination products can be used for the desulfurization process. In most cases, it is preferred to carry out the treatment under a mild condition where an oxidation reaction proceeds predominantly. For the treatment, there may be employed a mixture of two or more oxidizing agents as illustrated above. In the other aspect, a pulp-bleaching process can be regarded as the treatment of lignin with an oxidizing agent, and the waste solution of the said process can be utilized for the process of the present invention.

The thus treated products are usually an amorphous macromolecular substance being soluble in neutral and alkaline water. The chemical structures of the products have not been elucidated.

2. Treatment with a nitrating agent:

This treatment can be achieved by mere treating of the lignin with a nitrating agent. As illustrative of the nitrating agent for this treatment are nitric acid, fuming nitric acid, mixed acids (e.g. a mixture of nitric acid and sulfuric, phosphoric or acetic acid), and nitrogen oxides (e.g. nitrogen dioxide, nitrogen pentoxide). The condition for the treatment may be determined in consideration of the properties of the nitrating agent employed and the lignin to be treated. Generally, the treatment can be performed at a wide range of temperature, e.g. from 0° C to 200° C. For instance, the treatment of the condensed lignin can be performed with a 10 to 60% nitric acid at a temperature higher than 70° C, preferably to the boiling point, over a period of 3 to 60 hours. It is preferred in this case to use 6 to 10 parts by weight of nitric acid for 1 part by weight of the lignin. The yield is usually from 20 to 80%. The product is lightly soluble in water. It contains 3 to 8% of $NO_2$—nitrogen, and the neutralization equivalent is from 80 to 200. The yield of oxalic acid by-product is usually less than 15%.

3. Treatment with a demethylating agent:

This treatment can be achieved with such an agent being capable of eliminating methyl groups of the lignin as metal sulfides, e.g. sodium sulfide, potassium sulfide, calcium sulfide. The treatment is preferably carried out in an alkaline medium. In the pulp industries, methyl mercaptan, dimethyl sulfide or dimethylsulfoxide is produced by treating a waste liquor of the pulp production (e.g. a black liquor) with sodium hydroxide and sodium sulfide under heating. The waste liquor of this process contains so-called demethylated lignins and the latter can be used in the process of the present invention. Since the mother liquor of the demethylated lignins contains other active substances, they may be extracted with a suitable organic solvent such as ether, benzene and the like. The treatment of the lignin with a demethylating agent can be generally carried out at a temperature ranging from 50° to 250° C.

Although the oxidative lignin of the present invention can be prepared by one of the above-illustrated three treatments, two or all three treatments may be combined for the preparation of the oxidative lignin, if desired. Isolation and purification of the oxidative lignin are not essential, and the reaction mixture resulting from the treatment can be used as the desulfurization agent, especially when desulfurization of a gaseous material is intended. But, if necessary, the product may be isolated and purified according to per se conventional procedures (e.g. neutralization, extraction, filtration).

When the thus prepared oxidative lignin is desired to be soluble in water and the solubility is insufficient, it may be further subjected to introduction of hydrophilic substituents. The introduction of hydrophilic substituents can be effected by per se conventional procedures. It includes sulfonation with sulfuric acid or a sulfite, sulfomethylation with formalin and a sulfite, and treatment with a halogen, a halogen oxide or an aliphatic halogeno-carboxylic acid.

Further, an inorganic salt (e.g. metavanadates, ferric salts) may be added to the oxidative lignin to improve its activity together with a suitable holder (e.g. ethylenediamine tetraacetate).

From the above descriptions, it will be understood that various concrete procedures are available for production of the oxidative lignins of the invention. Among them, the following procedure is presently and particularly favorable in affording generally the oxidative lignin of a high desulfurization activity: the starting lignin (1 part by weight) is treated with a nitrating agent (e.g. 10 to 60%, preferably 20 to 40%, nitric acid) (1 to 30 parts by weight, preferably 6 to 10 parts by weight) at a temperature from 0° to 200° C (preferably from 50° to 150° C) under an atmospheric or elevated pressure (usually atmospheric pressure) for a period of 0.5 to 80 hours (preferably 3 to 60 hours). Although the physicochemical properties of the resultant oxidative lignin are widely varied with the kind of the starting lignin and the conditions of treatment, the one having a high desulfurization activity is usually less than 12%, particularly 3 to 8%, in the $NO_2$-nitrogen content and more than 80, particularly 80 to 200 in the neutralization equivalent.

With the thus prepared oxidative lignins, hydrogen sulfide contained in a gaseous or liquid material can be completely removed and converted into sulfur. Examples of the gaseous or liquid material to be purified by the process of the present invention are coal gas, coke oven gas, synthesis gas, natural gas, air, liquid hydrocarbon and the like.

Practical procedures of the present invention are carried out in a variety of manners in accordance with the properties and states of the material to be purified and the quantities of hydrogen sulfide contained therein. But, the essential is to make the said material be in contact with the oxidative lignins. For instance, when a liquid material is to be purified, an aqueous solution of the oxidative lignin is added to the material and the mixture is stirred or shaken until the conversion of hydrogen sulfide into sulfur is completed. On the contrary, a gaseous material may be passed through an aqueous solution of the oxidative lignin. Alternatively, a gaseous material may be introduced into a packed column of the oxidative lignin being adsorbed to a suitable carrier.

When the oxidative lignin is used in the form of an aqueous solution, it is preferred to adjust the pH within a range from 8.0 to 10.0. For this purpose, a base such as potassium hydroxide, sodium hydroxide, ammonia, potassium carbonate, an alkanolamine and the like may be added to the aqueous solution of the oxidative lignin.

The contact may be achieved under any conditions of temperature and pressure, because the activity of the oxidative lignin is not substantially affected by such conditions. But from the economical viewpoint, it is desirable to carry out the contact at a temperature from 0° C to 100° C, preferably from 10° C to 40° C.

By the contact, hydrogen sulfide is oxidized and converted into sulfur, and the oxidative lignin is simultaneously reduced and inactivated. But, it can be easily and completely regenerated by treatment with an oxidizing agent such as air or oxygen. Therefore, when the contact is carried out in the presence of air or oxygen, the removal of hydrogen sulfide can be effected continuously.

When the regeneration of the oxidative lignin is not required, the treatment of the inactivated oxidative lignin with an oxidizing agent such as air or oxygen is unnecessary, because hydrogen sulfide is oxidized by the activity of the oxidative lignin itself to sulfur.

As will be apparent from the above illustration, the process of the present invention is also useful for recovering sulfur from hydrogen sulfide or a hydrogen sulfide-containing material.

For the removal of hydrogen sulfide from gaseous materials and the recovery of sulfur, it is advantageous to adopt a so-called wet-adsorption procedure. For this purpose, there can be employed per se conventional equipment such as spay towers, deflector washers, mechanical scrubbers, atomizing scrubbers, wet filters and packed towers. It is most advantageous to make the gaseous material contact with an alkaline solution of the oxidative lignin in a contacting section and then to transfer the solution to a regeneration section where the solution is treated with an oxidizing agent such as air to regenerate the oxidative lignin as well as to complete the precipitation of sulfur. The regeneration solution can be returned to the contacting section after the removal of the precipitated sulfur.

In the above, it should be noted that, as stated hereinbefore, the conversion of hydrogen sulfide into sulfur proceeds when contacted with the oxidative lignin and thus the produced sulfur is already liberated as particles before the treatment with the oxidizing agent for regeneration of the oxidative lignin.

The process of the present invention is to overcome all the difficulties encountered in the hitherto known processes, and characterized by the advantages in the following points: (1) since hydrogen sulfide is converted into sulfur, no pollution of the air is caused; (2) since the oxidative lignin is quite harmless to human beings, no strict sanitary administration in the factory is requisite; (3) the oxidative lignin is quite non-corrosive against the plant steel; (4) the oxidative lignin is easily regenerated; (5) the oxidative lignin is adequately inactive against the materials to be purified (e.g. carbon dioxide, organo-sulfur compounds, hydrogen cyanide); (6) the oxidative lignin is highly economical, because it is prepared with ease from waste materials; and (7) the oxidative lignin is so stable as to be used quite safely even at a high temperature and a high pressure.

The following examples will illustrate the present invention in further details. It should be understood that they are presented for the purpose of illustration only, but not of limitation. The abbreviations used have conventional significances.

EXAMPLE 1

An absorption column is prepared by packing glass Raschig rings (external diameter 6 mm, internal diameter 4 mm, length 6 mm) in a glass tube (internal diameter 60 mm) to a height of 70 cm. An oxidative lignin solution (20° C) adjusted to pH 9.0 with sodium carbonate is passed from the top downwards through the column at a flow velocity of 0.6 L/min and a coke oven gas containing 4.9 g/NM$^3$ of hydrogen sulfide from the bottom upwards through the column at a flow velocity of 7.5 L/min. The outflow of the oxidative lignin solution is collected in a 22 L-glass vessel, and air is blown into the solution to complete the precipitation of sulfur. When 1 NM$^3$ of the coke oven gas is passed through the column, the precipitated sulfur is collected and weighed. The results are shown in the following Table 1. No hydrogen sulfide is detected from the outflow of the gas.

Table 1

| Oxidative Lignin No. | Concentration of Oxidative Lignin (w/v %) | Recovered Pure Sulfur (g) | Recovery Ratio (%) |
|---|---|---|---|
| 1 | 0.2 | 4.0 | 87 |
| 2 | 0.1 | 4.5 | 98 |
| 3 | 0.1 | 4.4 | 96 |
| 4 | 0.1 | 4.5 | 98 |
| 5 | 0.2 | 3.9 | 85 |
| 6 | 0.1 | 4.4 | 95 |
| 7 | 0.1 | 4.5 | 98 |
| 8 | 0.1 | 4.5 | 98 |
| 9 | 0.1 | 4.4 | 95 |
| 10 | 0.1 | 4.3 | 93 |
| 11 | — | 4.5 | 98 |
| 12 | — | 4.5 | 98 |
| 13 | — | 4.5 | 98 |

Note:
Oxidative lignin No. 1: thiolignin treated with an aqueous chlorine solution.
Oxidative lignin No. 2: lignosulfonic acid oxidized by air in the presence of copper oxide and then treated with hydrogen peroxide.
Oxidative lignin No. 3: lignosulfonic acid treated with bleaching liquor.
Oxidative lignin No. 4: lignosulfonic acid treated with an aqueous solution of sodium hypochlorite.
Oxidative lignin No. 5: lignosulfonic acid treated with peracetic acid.
Oxidative lignin No. 6: demethylated lignin treated with pressure oxygen in an alkaline medium.
Oxidative lignin No. 7: demethylated lignin treated with oxygen in the presence of copper oxide in an alkaline medium.
Oxidative lignin No. 8: condensed demethylated-lignin treated with oxygen in an aqueous solution of sodium hydroxide.
Oxidative lignin No. 9: condensed demethylated-lignin treated with potassium permanganate in an alkaline medium.
Oxidative lignin No. 10: condensed lignosulfonic acid treated with oxygen in an aqueous solution of sodium hydroxide.
Oxidative lignin No. 11: the oxidative lignin No. 4 admixed with 0.03 % of sodium metavanadate.
Oxidative lignin No. 12: containing 0.05 % of the oxidative lignin No. 6, 0.04 % of sodium metavanadate and a sufficient amount of ethylenediamine tetraacetate to hold the sodium metavanadate.
Oxidative lignin No. 13: containing 0.05 % of the oxidative lignin No. 8, 0.04 % of ferric chloride and a sufficient amount of ethylenediamine tetraacetate to hold the ferric chloride.

EXAMPLE 2

An absorption column is prepared by packing glass Raschig rings (external diameter 6 mm, internal diameter 4 mm, length 6 mm) in a glass tube (internal diameter 60 mm) to a height of 65 cm. An oxidative lignin solution adjusted to pH 8.9 ± 0.1 with a base is passed from the top downwards through the column at a flow velocity of 0.6 L/min and a coke oven gas containing 4.6 g/NM$^3$ of hydrogen sulfide from the bottom upwards through the column at a flow velocity of 6.5 L/min. The outflow of the oxidative lignin solution is collected in a 20 L-glass vessel, and air is blown into the solution to complete the precipitation of sulfur. When 1 NM$^3$ of the coke oven gas is passed through the column, the precipitated sulfur is collected and weighed. The results are shown in the following Table 2. No hydrogen sulfide is detected from the outflow of the gas.

Table 2

| Oxidative Lignin No. | Concentration* (w/v %) | Base** | Recovered Pure Sulfur (g) | Recovery Ratio (%) |
|---|---|---|---|---|
| 14 | 0.3 | Ammonia | 3.6 | 83 |
| 15 | 0.4 | Sodium carbonate | 3.3 | 76 |
| 16 | 0.3 | Sodium carbonate | 4.1 | 95 |
| 17 | 0.2 | Sodium carbonate | 4.2 | 97 |
| 18 | 0.2 | Ammonia | 4.3 | 99 |
| 19 | 0.2 | Ammonia | 4.2 | 97 |

Table 2-continued

| Oxidative Lignin No. | Concentration* (w/v %) | Base** | Recovered Pure Sulfur (g) | Recovery Ratio (%) |
| --- | --- | --- | --- | --- |
| 20 | 0.2 | Sodium carbonate | 4.3 | 99 |
| 21 | — | Sodium carbonate | 4.3 | 99 |

Note:
*concentration of the oxidative lignin.
**base for the pH adjustment.
The term s.g. means specific gravity.
Oxidative lignin No. 14: thiolignin treated with nitric acid (s.g. 1.38) in ethanol.
Oxidative lignin No. 15: lignosulfonic acid treated with nitric acid (s.g. 1.38) in water.
Oxidative lignin No. 16: lignosulfonic acid treated with nitric acid (s.g. 1.50) in acetic acid.
Oxidative lignin No. 17: wood-saccharification lignin treated with nitric acid (s.g. 1.38) in water.
Oxidative lignin No. 18: wood-saccharification lignin treated with nitric acid (s.g. 1.50) in acetic acid.
Oxidative lignin No. 19: chlorolignin treated with nitric acid (s.g. 1.38) in water.
Oxidative lignin No. 20: an oxidized lignin (prepared by treating lignosulfonic acid with air and then with sodium peroxide) treated with nitric acid (s.g. 1.50) in ethanol.
Oxidative lignin No. 21: containing 0.15 % of the oxidative lignin No. 1, 0.1 % of sodium metavanadate, 0.01 % of ferric chloride and a sufficient amount of ethylenediamine tetraacetate to hold the sodium metavanadate and ferric chloride.

EXAMPLE 3

An absorption column is prepared by packing glass Raschig rings (external diameter 6 mm, internal diameter 4 mm, length 6 mm) in a glass tube (internal diameter 50 mm) to a height of 70 cm. At normal temperature, an oxidative lignin solution adjusted to pH $9.0 \pm 0.1$ with sodium carbonate is passed from the top downwards through the column at a flow velocity of 0.33 L/min and a gaseous mixture of 30% of carbon dioxide and 70% of hydrogen containing 2 g/NM$^3$ of hydrogen sulfide from the bottom upwards through the column at a flow velocity of 7.5 L/min. The outflow of the oxidative lignin solution is collected in a 10 L glass vessel, and air is blown into the solution to complete the precipitation of sulfur. When 1 NM$^3$ of the gaseous mixture is passed through the column, the precipitated sulfur is collected and weighed. The results are shown in the following Table 3. No hydrogen sulfide is detected from the outflow of the gaseous mixture.

Table 3

| Oxidative Lignin No. | Concentration of Oxidative Lignin (w/v %) | Recovered Pure Sulfur (g) | Recovery Ratio (%) |
| --- | --- | --- | --- |
| 22 | 0.5 | 1.5 | 80 |
| 23 | 0.3 | 1.7 | 90 |
| 24 | 0.3 | 1.8 | 96 |
| 25 | 0.2 | 1.8 | 96 |
| 26 | 0.2 | 1.8 | 96 |

Note:
Oxidative lignin No. 22: thiolignin treated with nitric acid (s.g. 1.38) in water.
Oxidative lignin No. 23: thiolignin treated with nitric acid (s.g. 1.50) in acetic acid.
Oxidative lignin No. 24: lignosulfonic acid treated with nitric acid (s.g. 1.38) in ethanol.
Oxidative lignin No. 25: wood-saccharification lignin treated with nitric acid (s.g. 1.38) in ethanol.
Oxidative lignin No. 26: chlorolignin treated with nitric acid (s.g. 1.38) in ethanol.

EXAMPLE 4

In a glass tube (internal diameter 60 mm) is placed a solution of 2 g of the oxidative lignin No. 5 of the preceding Example and 20 g of sodium carbonate in 1.5 L of water. From the bottom of the tube, an air containing 1.5 g/NM$^3$ of hydrogen sulfide is introduced into the solution at a flow velocity of 2 L/min. After 1 NM$^3$ of the air is passed through the tube, 1.3 g of sulfur is recovered. The outflow of the air contains no detectable hydrogen sulfide.

EXAMPLE 5

An absorption column is prepared by packing glass Raschig rings (external diameter 6 mm, internal diameter 4 mm, length 6 mm) in a glass tube (internal diameter 50 mm) to a height of 70 cm. An oxidative lignin solution (adjusted to pH $9.0 \pm 0.1$; temperature 25° C) is passed from the top downwards through the column at flow velocity of 0.42 L/min and a coke oven gas containing 5.1 g/NM$^3$ of hydrogen sulfide from the bottom upwards through the column at a flow velocity of 8.3 L/min. The outflow of the oxidative lignin solution is collected in a 10 L-glass vessel, and air is blown into the solution to complete the precipitation of sulfur. The regenerated oxidative lignin solution is returned to the absorption column. When 1 NM$^3$ of the gas is passed through the column, the precipitated sulfur is collected and weighed. The results are shown in the following Table 4. No hydrogen sulfide is detected from the outflow of the gas.

Table 4

| Oxidative Lignin No. | Concentration of Oxidative Lignin (w/v %) | Recovered Pure Sulfur (g) |
| --- | --- | --- |
| 27 | 0.3 | 4.5 |
| 28 | 0.3 | 4.6 |
| 29 | 0.2 | 4.6 |
| 30 | 0.3 | 4.5 |
| 31 | 0.2 | 4.6 |
| 32 | 0.2 | 4.6 |
| 33 | 0.2 | 4.7 |
| 34 | 0.2 | 4.7 |
| 35 | — | 4.7 |
| 36 | — | 4.7 |
| 37 | — | 4.6 |
| 38 | 0.2 | 4.4 |

Note:
Oxidative lignin No. 27: demethylated lignin prepared by heating a waste liquid of kraft pulp in the presence of sodium hydroxide and sodium sulfide.
Oxidative lignin No. 28: demethylated lignin sulfonated with sodium sulfite.
Oxidative lignin No. 29: demethylated lignin sulfomethylated with formalin and sodium sulfite.
Oxidative lignin No. 30: demethylated lignin treated with formalin and monochloroacetic acid.
Oxidative lignin No. 31: demethylated lignin treated with nitric acid in ethanol.
Oxidative lignin No. 32: demethylated lignin treated with nitric acid in carbon tetrachloride.
Oxidative lignin No. 33: demethylated lignin treated with nitric acid in water.
Oxidative lignin No. 34: demethylated lignin treated with a mixed acid.
Oxidative lignin No. 35: containing 0.1 % of the oxidative lignin No. 5, 0.1 % of sodium metavanadate and a sufficient amount of ethylenediamine tetraacetate to hold the sodium metavanadate.
Oxidative lignin No. 36: containing 0.1 % of the oxidative lignin No. 3, 0.1 % of sodium metavanadate and a half molar amount (against the sodium metavanadate) of sodium potassium tartrate.
Oxidative lignin No. 37: containing 0.2 % of the oxidative lignin No. 1, 0.1 % of ferric chloride and a sufficient amount of ethylenediamine tetraacetate to hold the ferric chloride.
Oxidative lignin No. 38: sulfomethylation product of the ether extract obtained from a waste liquor of the preparation of demethylated lignin

EXAMPLE 6

An absorption column is prepared by packing glass Raschig rings (external diameter 6 mm, internal diameter 4 mm, length 6 mm) in a glass tube (internal diameter 50 mm) to a height of 70 mm. An oxidative lignin solution adjusted to an alkaline pH is passed from the top downwards through the column at a flow velocity of 25 L/h and a gaseous mixture of 30% of carbon dioxide and 70% of hydrogen containing 1.9 g/NM$^3$ of hydrogen sulfide from the bottom upwards through the column at a flow velocity of 20 L/min. The outflow of the solution is collected in a 20 L-glass vessel, and air is blown into the solution to complete the precipitation of sulfur. When 2 NM³ of the gaseous mixture is passed through the column, the precipitated sulfur is collected and weighed. The results are shown in the following Table 5. No hydrogen sulfide is detected from the outflow of the gaseous mixture Table 5

| Oxidative Lignin No. | Concentration of Oxidative Lignin (w/v %) | Recovered Pure Sulfur (g) |
|---|---|---|
| 27 | 0.3 | 3.3 |
| 29 | 0.3 | 3.3 |
| 31 | 0.2 | 3.3 |
| 34 | 0.2 | 3.4 |

Note:
The oxidative lignins are the same as those employed in the preceding Example.

EXAMPLE 7

In a glass tube (internal diameter 70 mm) is placed a solution of 2 g of the oxidative lignin No. 1 of the Example 5, 1 g of the oxidative lignin No. 31 of the said Example and 20 g of sodium carbonate in 1.5 L of water. From the bottom of the tube, air containing 1.6 g/NM³ of hydrogen sulfide is introduced into the solution at a flow velocity of 2 L/min. After 1 NM³ of the air is passed through the tube, 1.4 g of sulfur is recovered. The purity of the thus recovered sulfur is 99.7%. No hydrogen sulfide is detected from the outflow of the air.

EXAMPLE 8

An absorption column is prepared by packing glass Raschig rings (external diameter 6 mm, internal diameter 4 mm, length 6 mm) in a glass tube (internal diameter 50 mm) to a height of 70 cm. A 0.2% oxidative lignin solution (adjusted to pH 9.0 ± 0.2 with ammonia, sodium carbonate or potassium carbonate; temperature 25° C) is passed from the top downwards through the column at a flow velocity of 0.42 L/min and a coke oven gas containing 5.1 g/NM³ of hydrogen sulfide from the bottom upwards through the column at a flow velocity of 8.3 L/min. The outflow of the solution is collected in a 10 L-glass vessel, and air is blown into the solution to complete the precipitation of sulfur as well as to regenerate the oxidative lignin solution. The regenerated solution is returned to the absorption column. When 1 NM³ of gas is passed through the column, the precipitated sulfur is collected and weighed. The results are shown in the following Table 6. No hydrogen sulfide is detected from the outflow of the gas.

Table 6

| Oxidative Lignin No. | Recovery Ratio (%) | Oxidative Lignin No. | Recovery Ratio (%) |
|---|---|---|---|
| 39 | >98 | 49 | 95–97 |
| 40 | >98 | 50 | >98 |
| 41 | 95–98 | 51 | 93–95 |
| 42 | 96–98 | 52 | 93–96 |
| 43 | 98 | 53 | 98 |
| 44 | >98 | 54 | 96 |
| 45 | 97 | 55 | •97–98 |
| 46 | 97 | 56 | >98 |

Table 6-continued

| Oxidative Lignin No. | Recovery Ratio (%) | Oxidative Lignin No. | Recovery Ratio (%) |
|---|---|---|---|
| 47 | >98 | 57 | >98 |

Note:
Oxidative lignin No. 39: condensed lignin A (obtained by heating lignosulfonic acid) treated with nitric acid in water.
Oxidative lignin No. 40: condensed lignin A treated with nitric acid in carbon tetrachloride.
Oxidative lignin No. 41: condensed lignin A treated with nitric acid in ethanol.
Oxidative lignin No. 42: condensed A treated with a mixed acid.
Oxidative lignin No. 43: condensed lignin B (obtained by heating the condensed lignin A in an aqueous sodium hydroxide solution) treated with nitric acid in water.
Oxidative lignin No. 44: condensed lignin C (obtained by heating demethylated lignin) treated with nitric acid in water.
Oxidative lignin No. 45: condensed lignin C treated with nitric acid in carbon tetrachloride.
Oxidative lignin No. 46: condensed lignin C treated with a mixed acid.
Oxidative lignin No. 47: condensed lignin D (obtained by heating the condensed lignin C in an aqueous sodium hydroxide solution) treated with nitric acid in water.
Oxidative lignin No. 48: condensed lignin D treated with nitric acid in ethyl ether.
Oxidative lignin No. 49: condensed lignin D treated with a mixed acid.
Oxidative lignin No. 50: condensed lignin E (obtained by heating wood-saccharification lignin in water acidified with sulfuric acid) treated with nitric acid in water.
Oxidative lignin No. 51: condensed lignin F (obtained by reacting thiolignin with formalin and phenol) treated with nitric acid in water.
Oxidative lignin No. 52: condensed lignin G (obtained by reacting demethylated lignin with formalin and phenol) treated with nitric acid in water.
Oxidative lignin No. 53: containing 0.1 % of the oxidative lignin No. 6, 0.1 % of sodium metavanadate and a half molar amount (against the sodium metavanadate) of sodium potassium tartrate.
Oxidative lignin No. 54: the oxidative lignin No. 1 treated with oxygen in an aqueous sodium hydroxide solution.
Oxidative lignin No. 55: condensed lignin H (obtained by heating an ether extract from a waste liquid of the preparation of demethylated lignin) treated with nitric acid.
Oxidative lignin No. 56: condensed lignin I (obtained by heat treatment of the wood-saccharification product of Bark) treated with nitric acid.
Oxidative lignin No. 57: condensed lignin J (obtained by heating the condensed lignin I in an alkaline solution) treated with nitric acid.

EXAMPLE 9

An absorption column is prepared by packing glass Raschig rings (external diameter 6 mm, internal diameter 4 mm, length 6 mm) in a glass tube (internal diameter 50 mm) to a height of 70 cm. A 0.2% oxidative lignin solution (adjusted to pH 9.0 ± 0.5 with sodium carbonate; temperature 25 ± 0.5° C) is passed from the top downwards through the column at a flow velocity of 25 L/h and a gaseous mixture of 30% of carbon dioxide and 70% of hydrogen containing 1.9 g/NM³ of hydrogen sulfide from the bottom upwards through the column at a flow velocity of 20 L/min. The outflow of the solution is collected in a 20 L-glass vessel, and air is blown into the solution to complete the precipitation of sulfur as well as to regenerate the oxidative lignin solution which is returned to the column. When 2 NM³ of the gaseous mixture is passed through the column, the precipitated sulfur is collected and weighed. The results are shown in the following Table 7. No hydrogen sulfide is detected from the outflow of the gaseous mixture.

Table 7

| Oxidative Lignin No. | Recovered Pure Sulfur (g) |
|---|---|
| 39 | 3.5 |
| 42 | 3.4 |
| 43 | 3.5 |
| 44 | 3.4 |
| 47 | 3.5 |
| 50 | 3.5 |
| 52 | 3.4 |

Note:
The oxidative lignins are the same as those employed in the preceding Example.

EXAMPLE 10

In a glass tube (internal diameter 70 mm) is placed a solution of 3 g of a mixture of the oxidative lignins Nos. 39 and 44 of the Example 8 and 20 g of sodium carbonate in 1.5 L of water. From the bottom of the tube, air containing 1.7 g/NM$^3$ of hydrogen sulfide is introduced at a flow velocity of 2 L/min. After 2 NM$^3$ of the air is passed through the tube, 3.0 g of sulfur is recovered, and the purity of thus recovered sulfur is 99.8%. No hydrogen sulfide is detected from the outflow of the air.

EXAMPLE 11

A condensed lignin which is prepared by heating a kraft pulp black liquor (100 parts by weight) containing 15.6% thiolignin (methoxyl group 15.6%) together with sodium sulfide (8 parts by weight) at 250° C in an autoclave, is boiled in 1% sulfuric acid for 30 minutes, washed with water and dried. The thus obtained material (1 part by weight) is added to 40% nitric acid (40 parts by weight) and the mixture is boiled for 7 hours. After removal of the excess of nitric acid, a small amount of oxalic acid is precipitated as calcium salt and removed by filtration. The filtrate is treated with methylethylketone to precipitate the nitration product. Yield, 52%. NO$_2$-nitrogen, 5.8%. Neutralization equivalent, 101. Yield of oxalic acid, 1.2%.

EXAMPLE 12

The condensed lignin (the same as that used in the preceding Example) which contains 40% water and 1% (to the lignin) sulfuric acid is dried for 5 hours at 120° C. A mixture of the thus dried material (1 part by weight) and 30% nitric acid (10 parts by weight) is boiled for 10 hours to obtain the nitration product. Yield, 77%. NO$_2$-nitrogen, 5.2%. Neutralization equivalent, 99. Yield of oxalic acid, 0.8%.

EXAMPLE 13

A mixture of the condensed lignin (the same as that used in Example 11) (1 part by weight) and 30% nitric acid (7 parts by weight) is boiled for 7 hours to obtain the nitration product. Yield, 57%. NO$_2$-nitrogen, 3.2%. Neutralization equivalent, 132. Yield of oxalic acid, 5.5%.

EXAMPLE 14

To the condensed lignin (the same as that used in Example 11) (1 part by weight) is added 0.5% sulfuric acid (7 parts by weight), and the mixture is boiled under stirring for 1 hour. Then, 62% nitric acid (7 parts by weight) is added gradually to the mixture and boiled for 8 hours to obtain the nitration product. Yield, 71%. NO$_2$-nitrogen, 4.0%. Neutralization equivalent, 134. Yield of oxalic acid, 4%.

EXAMPLE 15

Lignosulfonic acid containing 50% water and 0.7% (to the lignosulfonic acid) sulfuric acid is heated at 120° C for 5 hours. The thus obtained material (1 part by weight) is added to 35% nitric acid (10 parts by weight), and the mixture is boiled for 12 hours to obtain the nitration product. Yield, 34%. NO$_2$-nitrogen, 3.4%. Yield of oxalic acid, 11%.

EXAMPLE 16

Lignosulfonic acid is heated at 200° C for 4 hours in nitrogen atmosphere. A mixture of the thus produced material (1 part by weight) and 30% nitric acid (10 parts by weight) is boiled for 8 hours to obtain the nitration product. Yield, 24%. Yield of oxalic acid, 12%.

EXAMPLE 17

A mixture of sodium lignosulfonate (2 parts by weight) and 10% sodium hydroxide (10 parts by weight) is heated at 200° C for 5 hours in an autoclave. After cooling, the mixture is acidified with sulfuric acid, the precipitated product is washed with water and dried. The thus obtained material (1 part by weight) is added to nitric acid (10 parts by weight), and the mixture is boiled for 7 hours to obtain the nitration product. Yield, 62%. NO$_2$-nitrogen, 3%. Neutralization equivalent, 112.

EXAMPLE 18

Lignosulfonic acid (1 part by weight) is added to 1% sulfuric acid (7 parts by weight) and the mixture is boiled under stirring for 1 hour. Then, 62% nitric acid (7 parts by weight) is added dropwise, and the mixture is boiled for 5 hours to obtain the nitration product. Yield, 46%.

EXAMPLE 19

To 40–60 mesh saw-dust (1 part by weight) is added 0.5% sulfuric acid (10 parts by weight) and the mixture is heated with steam under a pressure of 3 kg/cm$^2$. The product (1 part by weight) is kneaded with 80% sulfuric acid (1.25 parts by weight), and the resultant paste is diluted with water so as to make the concentration of sulfuric acid 15%. The mixture is boiled for 45 minutes, the resultant precipitate is collected by filtration, washed with water and dried to afford a condensed lignin. The condensed lignin containing 35% water and 1% (to the condensed lignin) sulfuric acid is heated for 5 hours at 150° C. A mixture of the thus obtained material (1 part by weight) and 40% nitric acid is boiled for 12 hours to obtain the nitration product. Yield, 30%. Neutralization equivalent, 158. Yield of oxalic acid, 6.8%.

EXAMPLE 20

A mixture of the condensed lignin (the same as that prepared in the preceding Example) (2 parts by weight) and 10% sodium hydroxide (10 parts by weight) is heated at 200° C for 5 hours. After cooling, the mixture is acidified with sulfuric acid, the precipitate is collected by filtration, washed with water and dried. A mixture of the thus obtained material (1 part by weight) and 30% nitric acid (10 parts by weight) is boiled for 8 hours to obtain the nitration product. Yield, 46%. NO$_2$-nitrogen, 2.8%. Neutralization equivalent, 108. Yield of oxalic acid, 15%.

EXAMPLE 21

A mixture of sulfuric acid lignin (10 parts by weight) and water (70 parts by weight) containing sodium hydroxide (3 parts by weight) is heated at 170° C for 2 hours. A mixture of the thus obtained material (1 part by weight) and 40% nitric acid (10 parts by weight) is boiled for 15 hours to obtain the nitration product. Yield, 32%.

EXAMPLE 22

A condensed lignin containing 50% water and 1% (to the condensed lignin) sulfuric acid is heated at 150° C for 5 hours. A mixture of the thus obtained material (1 part by weight) and 25% sulfuric acid (10 parts by weight) is boiled for 6 hours to obtain the nitration product. Yield, 22%. $NO_2$-nitrogen, 4.6%. Neutralization equivalent, 108. Yield of oxalic acid, 9.7%.

EXAMPLE 23

A waste liquor of the preparation of demethylated lignin from a black liquor is treated with sulfuric acid to precipitate demethylated lignin. The mother liquor is concentrated to one half its volume and extracted with ether. The extract is heated at 100°–150° C for 5 hours. A mixture of the thus obtained material (1 part by weight) and 50% nitric acid (10 parts by weight) is boiled for 4 hours to obtain the nitration product. Yield, 28%. Neutralization equivalent, 111.

EXAMPLE 24

A mixture of crushed bark (1 part by weight) and 0.5% sulfuric acid (10 parts by weight) is heated with steam for 40 minutes under a pressure of 3 kg/cm². The product (1 part by weight) and 80% sulfuric acid are kneaded and the resulted paste is diluted with water so as to make the concentration of sulfuric acid 15%. The mixture is boiled for 45 minutes. The precipitate is collected by filtration and heated further for 5 hours at 260° C. A mixture of the thus obtained material (1 part by weight) and 50% nitric acid (10 parts by weight) is boiled for 5 hours to obtain the nitration product. Yield, 41%. Neutralization equivalent, 102.

What is claimed is:

1. A process for the removal of hydrogen sulfide from gaseous or liquid material containing hydrogen sulfide which comprises bringing said material into contact with an aqueous solution of a nitrated lignin derivative, said solution having a pH of from 8 to 10, at a temperature between 0° and 100° C, said lignin derivative (1) being the product obtained by treating a lignin with a nitrating agent at a temperature from 0° to 200° C for 0.5 to 80 hours and (2) containing from 3 to 8% nitrogen as nitro groups and having a neutralization equivalent of more than 80.

2. The process according to claim 1, wherein the lignin is a condensed lignin.

3. The process according to claim 2, wherein the condensed lignin is a pulp waste liquor lignosulfonic acid which has been condensed through heat.

4. The process according to claim 1, wherein the lignin is a demethylated lignin.

5. The process according to claim 1, wherein the lignin is a wood saccharification lignin.

6. The process according to claim 1, wherein said lignin derivative is the product obtained by treating a lignin with from 6 to 10 parts by weight of a nitrating agent, per part of lignin.

7. The process according to claim 1, wherein the lignin derivative is the product obtained upon subjecting protolignin, an isolated lignin, a condensed lignin or a denatured lignin to said nitration.

8. The process according to claim 1, wherein the nitrating agent is a member selected from the group consisting of nitric acid, fuming nitric acid, mixed acids and nitrogen oxides.

9. The process according to claim 1, wherein said solution of said lignin derivative also contains sodium metavanadate.

10. The process according to claim 9, wherein said aqueous solution of the lignin derivative also contains ethylenediamine tetraacetate.

11. The process according to claim 10, wherein said solution of said lignin derivative also contains ethylenediamine tetraacetate.

12. A process for the removal of hydrogen sulfide from gaseous or liquid material containing hydrogen sulfide and conversion of the hydrogen sulfide to sulfur which comprises (a) contacting the gaseous or liquid material at a temperature between 0° and 100° C with an alkaline solution of a nitrated lignin derivative (1) being the product obtained by treating a lignin with a nitrating agent selected from the group consisting of nitric acid, fuming nitric acid, mixed acids and nitrogen oxides at a temperature from 0° to 200° C for 0.5 to 80 hours and (2) containing from 3 to 8% nitrogen as nitro groups and having a neutralization equivalent of more than 80, and (b) passing air through the solution whereby the lignin derivative is regenerated.

13. The process according to claim 12, wherein said aqueous solution of said lignin derivative is at a pH of 8–10 and also contains sodium metavanadate.

* * * * *